United States Patent
Patel et al.

[19]

[11] Patent Number: 5,901,786
[45] Date of Patent: May 11, 1999

[54] AXIAL FAN SANDWICH COOLING MODULE INCORPORATING AIRFLOW BY-PASS FEATURES

[75] Inventors: Upendra Patel, Dearborn; Ajit Ravindra Shembekar, Farmington Hills, both of Mich.; James Alan Acre, Barker, N.Y.

[73] Assignee: Ford Motor Company, Dearborn, Mich.

[21] Appl. No.: 09/157,429

[22] Filed: Sep. 21, 1998

[51] Int. Cl.⁶ .................................................. F01P 7/02
[52] U.S. Cl. ........................... 165/283; 165/297; 165/41; 165/51; 165/103; 165/140; 123/41.04; 123/41.06; 123/41.49; 236/35.3; 62/184; 62/DIG. 17; 62/244; 180/68.4
[58] Field of Search .............................. 165/41, 103, 140, 165/51, 283, 297; 123/41.04, 41.05, 41.06, 41.49, 41.31; 62/184, DIG. 17, 244; 180/68.1, 68.4

[56] References Cited

U.S. PATENT DOCUMENTS

| | | |
|---|---|---|
| 3,061,277 | 10/1962 | Anderson . |
| 3,451,468 | 6/1969 | Furrow . |
| 3,777,808 | 12/1973 | Izumi . |
| 3,854,459 | 12/1974 | Stimeling ............................. 123/41.49 |
| 4,485,624 | 12/1984 | Melchior ................................ 236/35.3 |
| 4,510,991 | 4/1985 | Kawahira . |
| 4,569,631 | 2/1986 | Gray, III . |
| 4,590,772 | 5/1986 | Nose et al. ................................. 62/184 |
| 4,590,889 | 5/1986 | Hiereth ................................. 123/41.05 |
| 4,651,816 | 3/1987 | Struss et al. . |
| 4,756,279 | 7/1988 | Temmesfeld ......................... 123/41.04 |
| 4,971,143 | 11/1990 | Hogan . |
| 5,046,550 | 9/1991 | Boll et al. . |
| 5,069,040 | 12/1991 | Walker .............................. 62/DIG. 17 |
| 5,086,830 | 2/1992 | Heinle et al. . |
| 5,205,484 | 4/1993 | Susa et al. ............................ 123/41.04 |
| 5,215,044 | 6/1993 | Banzhaf et al. ..................... 123/41.05 |
| 5,226,285 | 7/1993 | Dankowski ............................... 62/184 |
| 5,259,206 | 11/1993 | Dankowski . |
| 5,342,167 | 8/1994 | Rosseau . |
| 5,342,173 | 8/1994 | Vera . |
| 5,476,130 | 12/1995 | Iwasaki et al. . |

FOREIGN PATENT DOCUMENTS

| | | |
|---|---|---|
| 208920 | 10/1959 | Austria . |
| 0 117 775 A1 | 9/1984 | European Pat. Off. . |
| 61671 | 5/1955 | France . |
| 1 027 698 | 4/1958 | Germany . |
| 31 12630 A1 | 7/1982 | Germany . |
| 0050215 | 5/1981 | Japan ........................................ 60/599 |
| 0067918 | 4/1983 | Japan ................................. 123/41.49 |
| 0165519 | 9/1983 | Japan ....................................... 62/184 |
| 0252876 | 10/1989 | Japan ....................................... 62/184 |
| 5-10125 | 1/1993 | Japan ................................. 123/41.05 |
| 363559 | 12/1931 | United Kingdom . |

*Primary Examiner*—John K. Ford
*Attorney, Agent, or Firm*—Raymond L. Coppiellie

[57] ABSTRACT

A cooling module for an automotive vehicle is disclosed. The module includes a pair of bypass doors for directing a flow of air around either of the condenser or radiator in the module depending upon the demands for engine cooling, air conditioning, and any other cooling requirements. Under suitable conditions, the radiator bypass feature or the condenser bypass feature will open, providing additional cooling for the condenser or radiator respectively, in order to satisfy given cooling requirements more efficiently.

13 Claims, 3 Drawing Sheets

AXIAL FAN SANDWICH COOLING MODULE INCORPORATING AIRFLOW BY-PASS FEATURES

BACKGROUND OF THE INVENTION

1. Field of the Invention

The present invention relates generally to cooling modules for automotive applications. More particularly, the present invention relates to cooling modules having airflow by-pass features.

2. Disclosure Information

Cooling modules used in automotive applications typically consist of a condenser, auxiliary heat exchangers, an engine cooling fan, and a radiator. Ambient air from the surrounding environment travels through the cooling module, whereupon the engine is cooled by the action of the radiator, and climate control of an enclosed space can be provided by the action of the condenser in conjunction with other known air conditioning system components.

Because the cooling module is enclosed, the same amount of air must flow through both the radiator and the condenser. Thus if the airflow required by the radiator and the condenser to satisfy the need for engine cooling and climate control respectively are different from one another, the engine cooling fan must provide for the greater airflow requirement. If these two requirements for airflow differ greatly, the efficiency of the cooling module could decrease dramatically. Airflow through each heat exchanger, the radiator and condenser, not only sees the pressure drop associated with that heat exchanger, but also the pressure drop associated with the other heat exchanger. In most applications, the radiator is positioned downstream of the condenser. Thus, the air which flows through the radiator is not at ambient temperature, as it has already been heated by the condenser. The radiator and condenser also provide resistance to the airflow drawn by the cooling fan, thus the cooling fan requires greater energy to overcome this resistance. Because of all of these effects, there is an inherent drop in efficiency associated with having the radiator and condenser positioned in-line with one another, as the cooling fan must consume more power. The operation of the cooling fan then becomes louder.

Prior art devices have overcome the problem of this decrease in efficiency by having two heat exchangers in separate airstreams. The inventors of the present invention have found disadvantages with the prior approach. For example, not only does this approach require the use of two fans rather that one, thereby increasing the production cost, but it also forces the cooling module to occupy more space. In order for such an approach to occupy the same amount of space as the conventional approach of placing the condenser and radiator in-line with one another, the core face area of each heat exchanger would need to be cut in half. This decrease in core face area would also result in a decrease in heat exchange. Concerns regarding cost and space, such as the limited space under a hood in an automotive application of a cooling module, dictate that the condenser and radiator be placed in line with one another.

SUMMARY OF THE INVENTION

An object of the present invention is to provide an axial fan sandwich cooling module, having paths by which airflow can bypass the radiator or condenser. This object is achieved and disadvantages of prior art approached are overcome by providing a novel cooling module.

In one particular aspect of the invention, a cooling module is disposed in an engine compartment of an automotive vehicle, the engine compartment housing a vehicle engine and having an airflow inlet opening at the front of the vehicle. The airflow inlet allows a volume of air to enter the engine compartment. The cooling module comprises a housing defining a volume in which the module is placed, condenser means for condensing a gaseous refrigerant, the condenser means being disposed so as to receive a flow of air entering the engine compartment through the airflow inlet opening and radiator means disposed downstream from the condenser means for cooling the engine. The module further includes a fan assembly comprising a rotary fan disposed in a fan shroud, the assembly being interposed between the condenser means and the radiator means. The fan assembly draws a volume of air through the condenser means and blows the air through the radiator means toward the engine. The module further comprises a radiator bypass door for controlling a volume of air passing through the radiator means, the radiator bypass door being hingedly connected to the housing as well as a condenser bypass door for controlling a volume of air passing through the condenser means, the condenser bypass door being hingedly connected to the housing. The module also includes control means for operating the radiator bypass door and the condenser bypass door according to a predetermined control strategy.

The module may also include a pair of auxiliary heat exchangers which discharge heat to the flow of air passing thereby in order to cool other devices and fluids such as transmission oil, power steering oil, hydraulic fan oil, and charge air. The bypass members may be doors, rotating collars on the fan shroud, sliding gate-type grids, or any other method of opening and closing holes in a surface. Any method to open and close the airflow bypass feature may be used. Preferred methods include using a vacuum motor, a stepper motor, or an electric solenoid. The radiator bypass feature is activated whenever the demand for air conditioning exceeds a predetermined value and the engine temperature is below a predetermined value, as to allow a greater airflow through the condenser for a given amount of power consumption by the cooling fan. The condenser bypass feature is activated whenever the engine temperature exceeds a predetermined value and the demand for air conditioning is below a predetermined value, as to allow a greater airflow through the radiator for a given amount of power consumption by the cooling fan. By adding such bypass features to a conventional cooling module, airflow is directed to portions of the cooling module which require it, while airflow is diverted from those apparatuses within the cooling module which do not require a greater flow and would only provide a greater resistance to the operation of the cooling fan.

An advantage of the present invention is that an efficient axial fan sandwich cooling module is provided. Another advantage of the present invention is that excessive noise from the operation of the engine cooling fan is controlled.

Still another advantage of the present invention is that the sizes of the radiator and condenser respectively can be reduced, meeting the same demands of cooling.

Other objects, features and advantages of the present invention will be readily apparent from the drawings, detailed description and claims which follow.

BRIEF DESCRIPTION OF THE DRAWINGS

The invention will now be described, by way of example, with reference to the accompany drawings, in which.

DETAILED DESCRIPTION OF THE PREFERRED EMBODIMENTS

Figure 1:
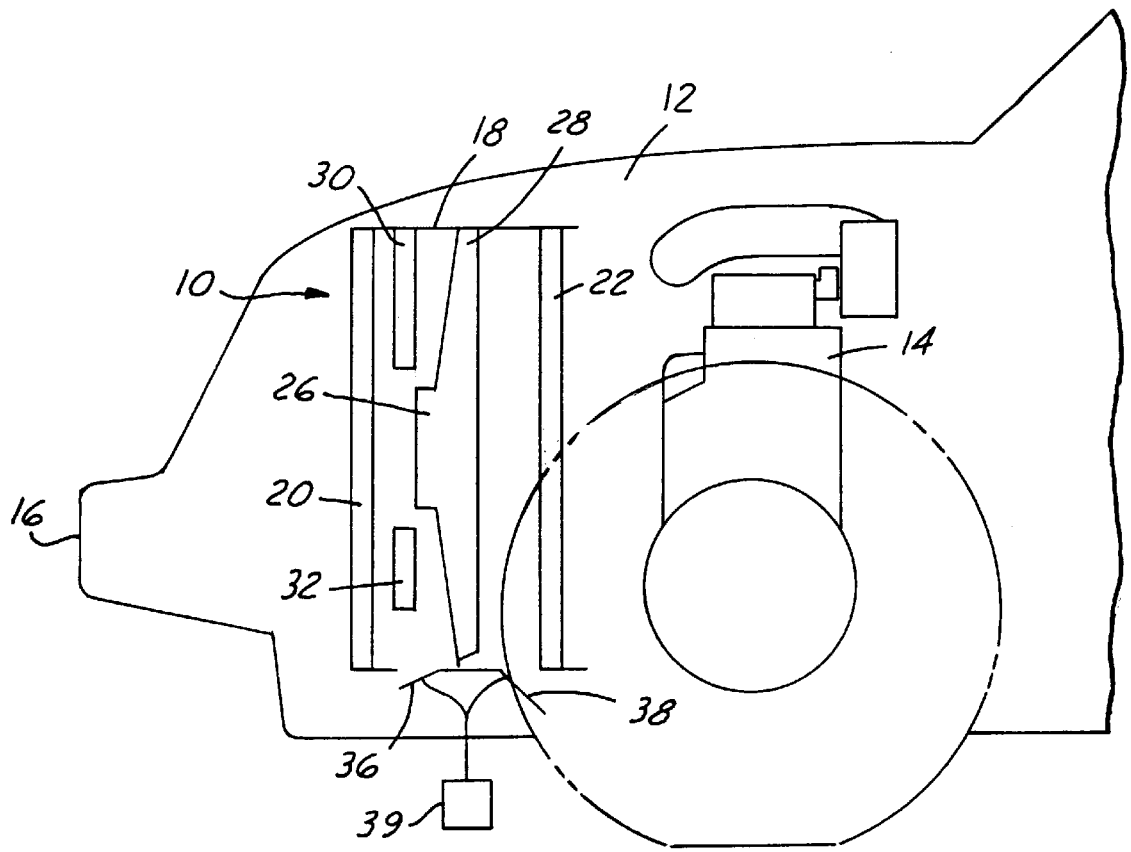
FIG. 1 is a diagrammatic representation of one embodiment of the present invention.
Figure 2:
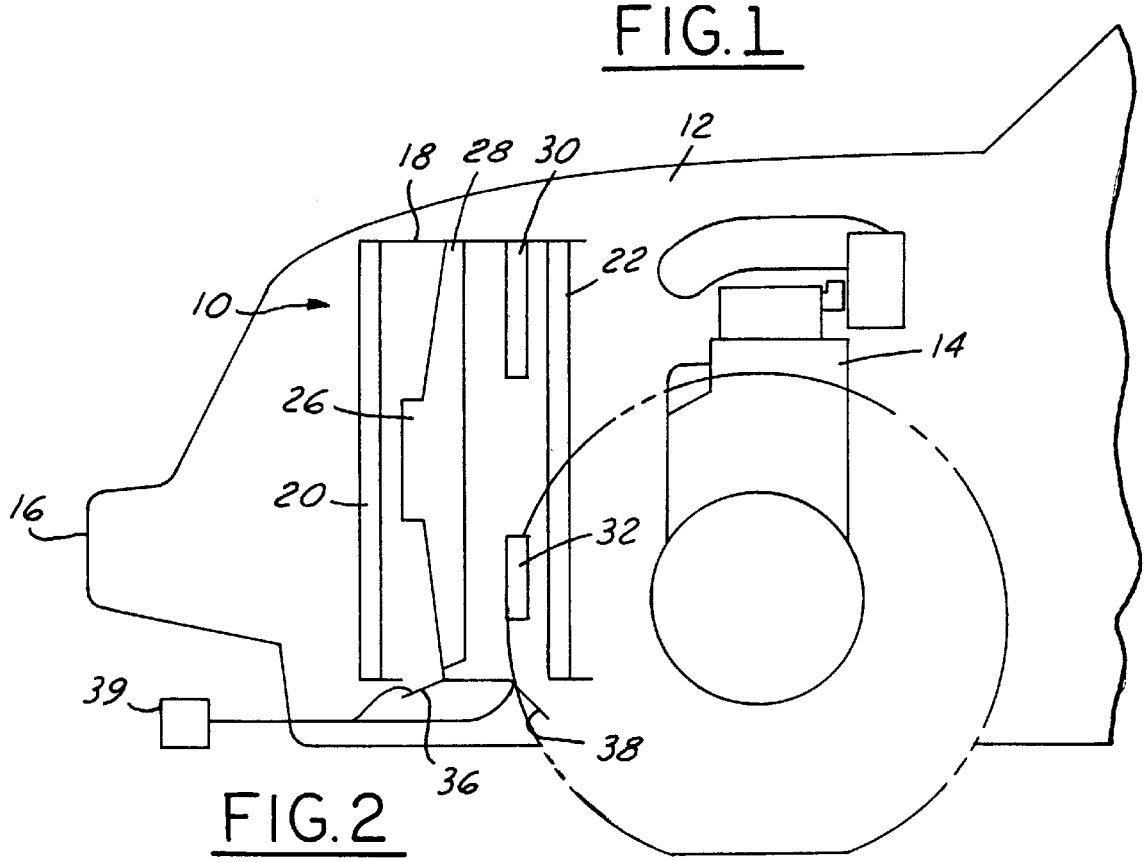
FIG. 2 is a diagrammatic representation of a second embodiment of the present invention.

Referring to the drawings, FIGS. 1 and 2 show a cooling module 10 with the various components and their placements according to the preferred embodiment of the present invention. The cooling module 10 is located in an engine compartment 12 of automotive vehicle. The cooling module 10 is disposed upstream from the vehicle engine 14 and receives airflow through an inlet opening 16 in the front of the vehicle. The module 10 is generally disposed within a housing 18 which can be formed from a thermoplastic material. The housing 18 may be molded as an integral one-piece unit having spaces for each component of the module. Alternatively, the module can be formed from many pieces and joined together in a known manner. The housing 18 defines an interior volume into which a condenser 20, a radiator 22, a fan assembly 26, and a pair of auxiliary heat exchangers 30, 32 are placed.

As is well known, the condenser 20 is a heat exchanger within the vehicle air conditioning system that is designed to dissipate heat from high temperature, high pressure, vapor refrigerant and condense it into a high pressure liquid, which subsequently enters an evaporator where it absorbs heat as it returns to its vapor form. The condenser 20 may be of any known tube-fin type and it is placed downstream from the airflow inlet opening 16 in the front of the vehicle. The radiator 22 having a plurality of fluid carrying tubes interposed between a plurality of fin members, disposed downstream from the condenser 20, is a heat exchanger within the engine cooling system that dissipates heat from the engine to the ambient air by circulating coolant through the engine in a known manner. The coolant continuously absorbs heat from the engine and upon circulation through the radiator dissipates it to the ambient air.

The cooling module 10 further includes a fan assembly 26 interposed between the condenser 20 and the radiator 22. As such, the fan assembly 26 is "sandwiched" between the two heat exchangers. The fan assembly 26 includes a radial fan having a plurality of fan blades attached to a hub and driven by a motor as is known. The fan is housed in fan shroud 28 which directs the air drawn by the fan to the radiator 22. The fan may include a number of features such as a fan stator (not shown) which are design to recover swirl imparted to the airflow passing through the fan. Diffusers may also be added to the fan hub or shroud for diffusing to control boundary layer characteristics of the air flow. Most importantly, the fan is disposed between the condenser 20 and radiator 22. This decreases fan noise since the heat exchangers act as "silencers" for the fan, improves fan durability because of the better cooling the module 10 provides, and increases fan efficiency which improves the vehicle's cooling performance without demanding more power.

Figure 5:
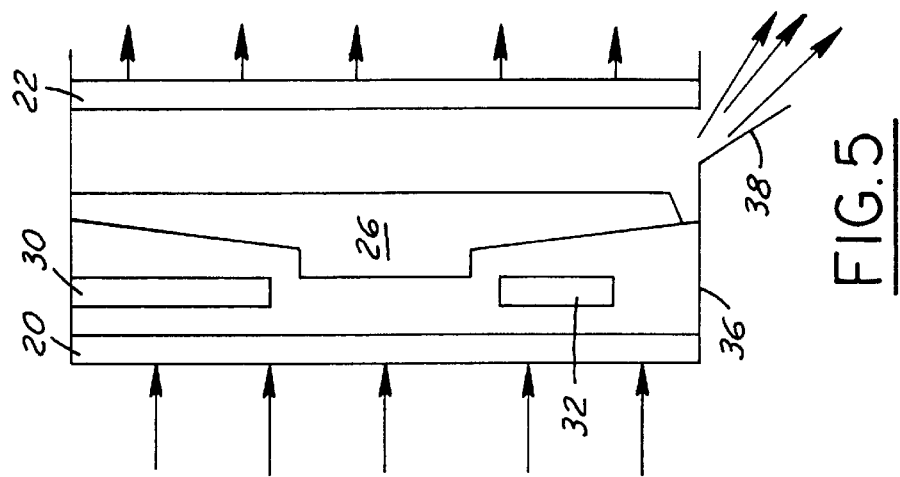
FIG. 5 is a representation of the operation of the embodiment illustrated in FIG. 1 while in "radiator by-pass mode"
Figure 4:
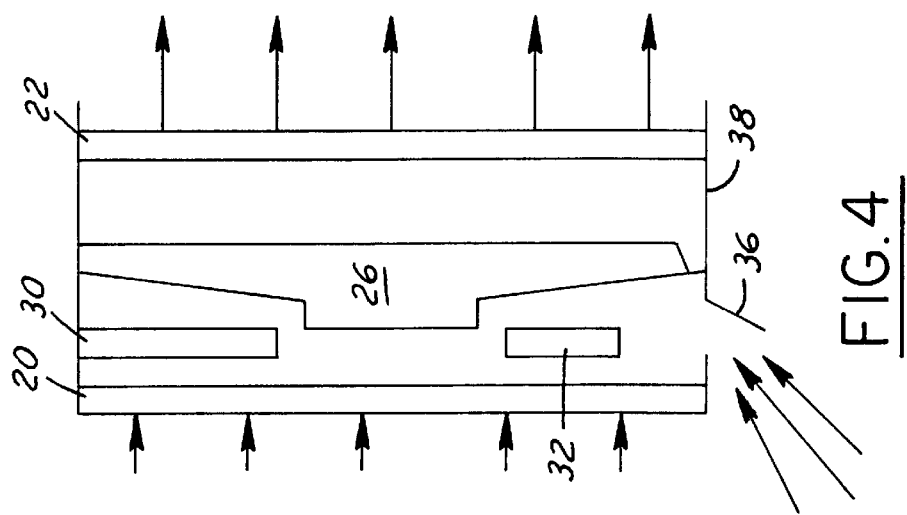
FIG. 4 is a representation of the operation of the embodiment portrayed in FIG. 1 while in "condenser by-pass mode"
Figure 3:
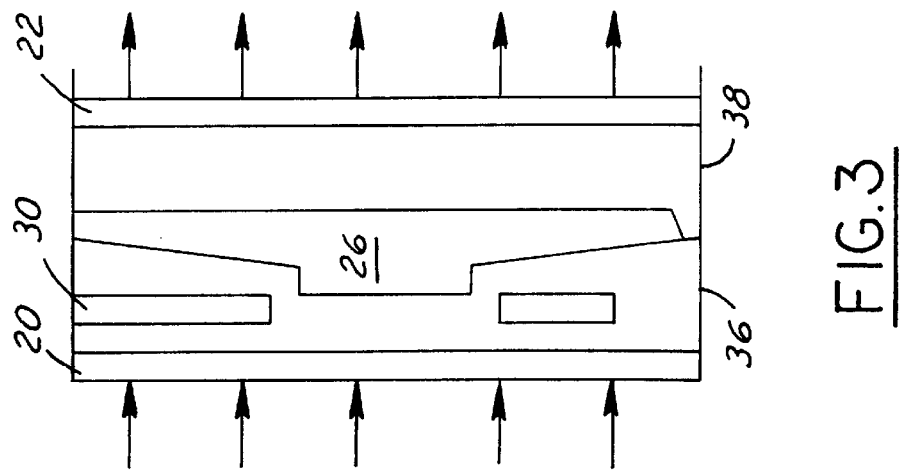
FIG. 3 is a diagrammatic representation of the standard operation of the embodiment depicted in FIG. 1.

The module also includes a pair of auxiliary heat exchangers 30, 32. These auxiliary heat exchangers 30, 32 provide cooling for other desired features in automotive applications, such as power steering fluid cooling, automatic transmission fluid cooling, or hydraulic fan operation. The difference in the modules 10 of FIGS. 1 and 2 is the location of the auxiliary heat exchangers. In FIG. 1, the auxiliary heat exchangers 30, 32 are place upstream for the fan assembly 26 and downstream of condenser 20. In FIG. 2, the auxiliary heat exchangers 30, 32 are place downstream of the fan assembly 26 and upstream of radiator 22. The ambient air is continuously flows through the cooling module 10 by the engine cooling fan 26, thus causing an airstream to pass through the radiator 22, condenser 20, and auxiliary heat exchangers 30, 32. The module 10 further includes a pair of bypass features. These features can be doors (such as is shown in FIGS. 3–5) or other known mechanical adjustment devices, such as rotating collars on the fan shroud, sliding gate-type grids, or any other method of opening and closing holes in a surface. A condenser bypass door 36 can be opened to supply a greater flow of air to the radiator 22, while the radiator bypass door 38 can be opened to supply a greater flow of air to the condenser 20. An actuating device 39, such as a stepper motor or a vacuum motor, is mechanically connected to the doors 36, 38 to move the doors from a first position to a second position according to a defined strategy as will be described below.

Referring now in particular to FIGS. 3–5, "normal" operation of the module 10 is shown in FIG. 3. Here, both doors 36, 38 are closed and the air flows through the cooling module 10, first passing through the condenser 20 as it enters the cooling module, and finally exits through the radiator 22, as indicated by the arrows. The direction of the arrows symbolizes the direction in which the air is traveling.

Turning now to FIG. 4, which depicts the enhanced engine cooling performance operation of the preferred embodiment of the present invention, the condenser airflow bypass door 36 is opened. This permits a portion of the cooling airflow to travel around the condenser 20, thus giving the radiator 22 additional airflow at a cooler temperature than would be seen during standard operation. This operation mode is utilized during severe engine cooling function such as pulling a trailer or climbing a steep grade in high ambient temperatures. Engine coolant temperature is monitored in known fashion, and when engine coolant temperature exceeds a threshold, the condenser airflow bypass door 36 is moved to a predetermined position by a motor electrically connected to a controller, such as an engine controller.

Referring now to FIG. 5, which depicts the enhanced air conditioning system performance operation of the preferred embodiment of the present invention, the radiator airflow bypass feature 38 is opened. This permits a portion of the cooling airflow to travel around the radiator 22, thus giving the condenser 20 additional airflow at a cooler temperature than would be seen during standard operation. This door 38 is positioned by motor 39 according to a predetermined strategy during heavy demand in the air conditioning system, when engine cooling function is not severe, such as when driving in heavy city traffic or at idle engine speed in high ambient temperatures. Air conditioning discharge pressure is monitored, and when the discharge pressure exceeds a threshold value, the radiator bypass door 38 is opened a predetermined amount depending on the discharge pressure value. This signal for activation can be disregarded if the engine coolant temperature is too high, so as to guarantee adequate engine cooling.

Figure 6:
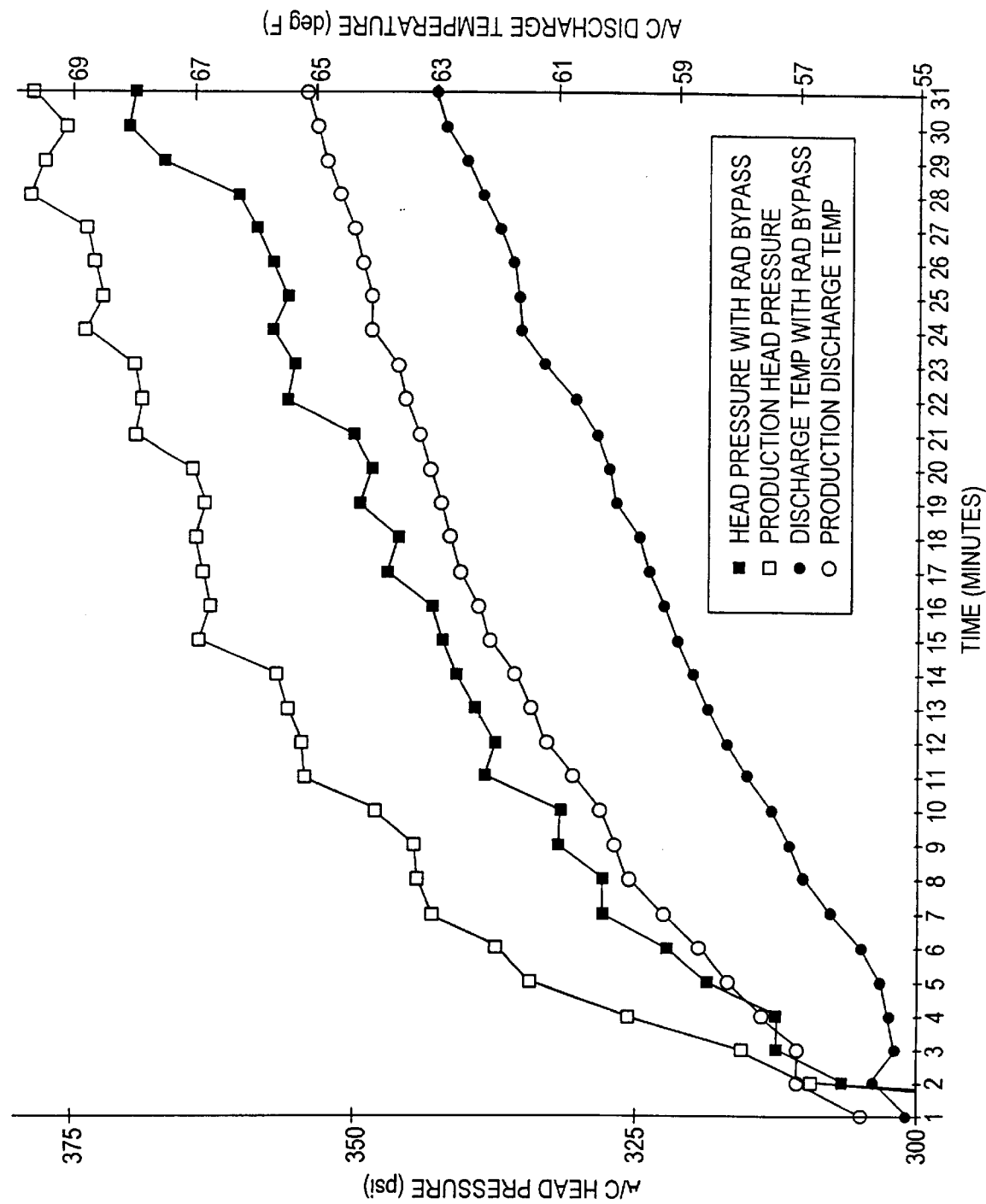
FIG. 6 is a graph of testing of the present invention compared to a vehicle without the present invention.

FIG. 6 shows a graphical representation of the performance enhancements of the present invention compared to a vehicle with a standard cooling configuration. For reference, the standard configuration includes a fan assembly downstream from a radiator and condenser, not "sandwiched" between them. Engine head pressure and condenser discharge temperature were measure for both systems. As can be seen, the vehicle with a cooling module of the present invention had significantly lower head pressure and discharge temperature, both desirable characteristics.

While the best mode for carrying out the invention has been described in detail, those skilled in the art in which this invention relates will recognize various alternative embodiments. For example, the auxiliary heat exchangers 30, 32 can be placed in front of (upstream from) the condenser and behind the fan relative to the airstream respectively. Every time air passes through a heat exchanger, such as a radiator, condenser, or the auxiliary heat exchangers described in this specification, its temperature increases by some amount. Thus, when the ambient air is 70 degrees Fahrenheit, only the front heat exchanger, relative to the airstream, sees air at 70 degrees Fahrenheit. The heat exchangers behind this front exchanger see air at higher temperatures. An increased temperature of the air that it interacts with causes a decrease in the capacity of a given heat exchanger to dissipate heat to that air. Thus by placing the auxiliary heat exchangers 30, 32 in front of the condenser 20, the auxiliary heat exchangers 30, 32 interact with cooler air than they otherwise would being placed behind the condenser, and can dissipate more heat per unit of core face surface area. However, in order to maximize the condenser's 20 performance, the auxiliary heat exchangers 30, 32 would be placed behind the condenser, as depicted in FIG. 1. Alternatively, the fan could be placed behind the radiator and the by-pass doors arranged to function as described above. It is the following claims, including all equivalents, which define the scope of the present invention.

What is claimed is:

1. A cooling module disposed in an engine compartment of an automotive vehicle, the engine compartment housing a vehicle engine and having an airflow inlet opening at the front of the vehicle, the airflow inlet allowing a volume of air to enter the engine compartment, said cooling module comprising:

a housing defining a volume in which said to module is placed;

condenser means for condensing a gaseous refrigerant, said condenser means being disposed so as to receive a flow of air entering said engine compartment through said airflow inlet opening;

radiator means disposed downstream from said condenser means for cooling said engine, said radiator means comprising a plurality of fluid carrying tubes interposed between a plurality of fin members;

a fan assembly comprising a rotary fan disposed in a fan shroud, said assembly being interposed between said condenser means and said radiator means, said assembly being operative to draw a volume of air through said condenser means and blow said air through said radiator means toward said engine;

a radiator bypass door for controlling a volume of air passing through said radiator means, said radiator bypass door being hingedly connected to said housing;

a condenser bypass door for controlling a volume of air passing through said condenser means, said condenser bypass door being hingedly connected to said housing; and control means for operating said radiator bypass door and said condenser bypass door according to a predetermined control strategy.

2. A cooling module according to claim 1, further including two auxiliary heat exchangers disposed in said module.

3. A cooling module according to claim 2, wherein said auxiliary heat exchangers are disposed between said fan assembly and said condenser means.

4. A cooling module according to claim 2, wherein said auxiliary heat exchangers are disposed between said fan assembly and said radiator means.

5. A cooling module according to claim 2, wherein one of said auxiliary heat exchangers is a transmission oil cooler.

6. A cooling module according to claim 2, wherein one of said auxiliary heat exchangers is a power steering fluid cooler.

7. A cooling module according to claim 1, further including means for moving said condenser and radiator bypass doors from a first position to a second position.

8. A cooling module according to claim 7, wherein said means comprises an electric stepper motor.

9. A cooling module according to claim 1, wherein said predetermined strategy comprises includes the steps of moving said condenser bypass door to a fully opened position and moving said radiator bypass door to a fully closed position when said radiator means exceeds a predetermined temperature.

10. A cooling module according to claim 1, wherein said predetermined strategy comprises includes the steps of moving said radiator bypass door to a fully opened position and moving said condenser bypass door to a fully closed position when said condenser means exceeds a predetermined temperature.

11. A cooling module disposed in an engine compartment of an automotive vehicle, the engine compartment housing a vehicle engine and having an airflow inlet opening at the front of the vehicle, the airflow inlet allowing a volume of air to enter the engine compartment, said cooling module comprising:

a housing defining a volume in which said module is placed;

a condenser for condensing a gaseous refrigerant, said condenser being disposed so as to receive a flow of air entering said engine compartment through said airflow inlet opening;

a radiator disposed downstream from said condenser for cooling said engine, said radiator comprising a plurality of fluid carrying tubes interposed between a plurality of fin members;

a fan assembly comprising a rotary fan disposed in a fan shroud, said assembly being interposed between said condenser and said radiator, said assembly being operative to draw a volume of air through said condenser and blow said air through said radiator toward said engine;

a pair of auxiliary heat exchangers are disposed between said fan assembly and said condenser;

a radiator bypass door for controlling a volume of air passing through said radiator, said radiator bypass door being hingedly connected to said housing;

a condenser bypass door for controlling a volume of air passing through said condenser, said condenser bypass door being hingedly connected to said housing;

a stepper motor connected to said condenser and radiator bypass doors and being operative to move said doors from a first position to a second position; and control means for operating said radiator bypass door and said condenser bypass door according to a predetermined control strategy.

12. A cooling module according to claim 11, wherein said predetermined strategy comprises includes the steps of moving said condenser bypass door to a fully opened position and moving said radiator bypass door to a fully closed position when said radiator means exceeds a predetermined temperature.

13. A cooling module according to claim 11, wherein said predetermined strategy comprises includes the steps of moving said radiator bypass door to a fully opened position and moving said condenser bypass door to a fully closed position when said condenser means exceeds a predetermined temperature.

* * * * *